Patented Dec. 18, 1951

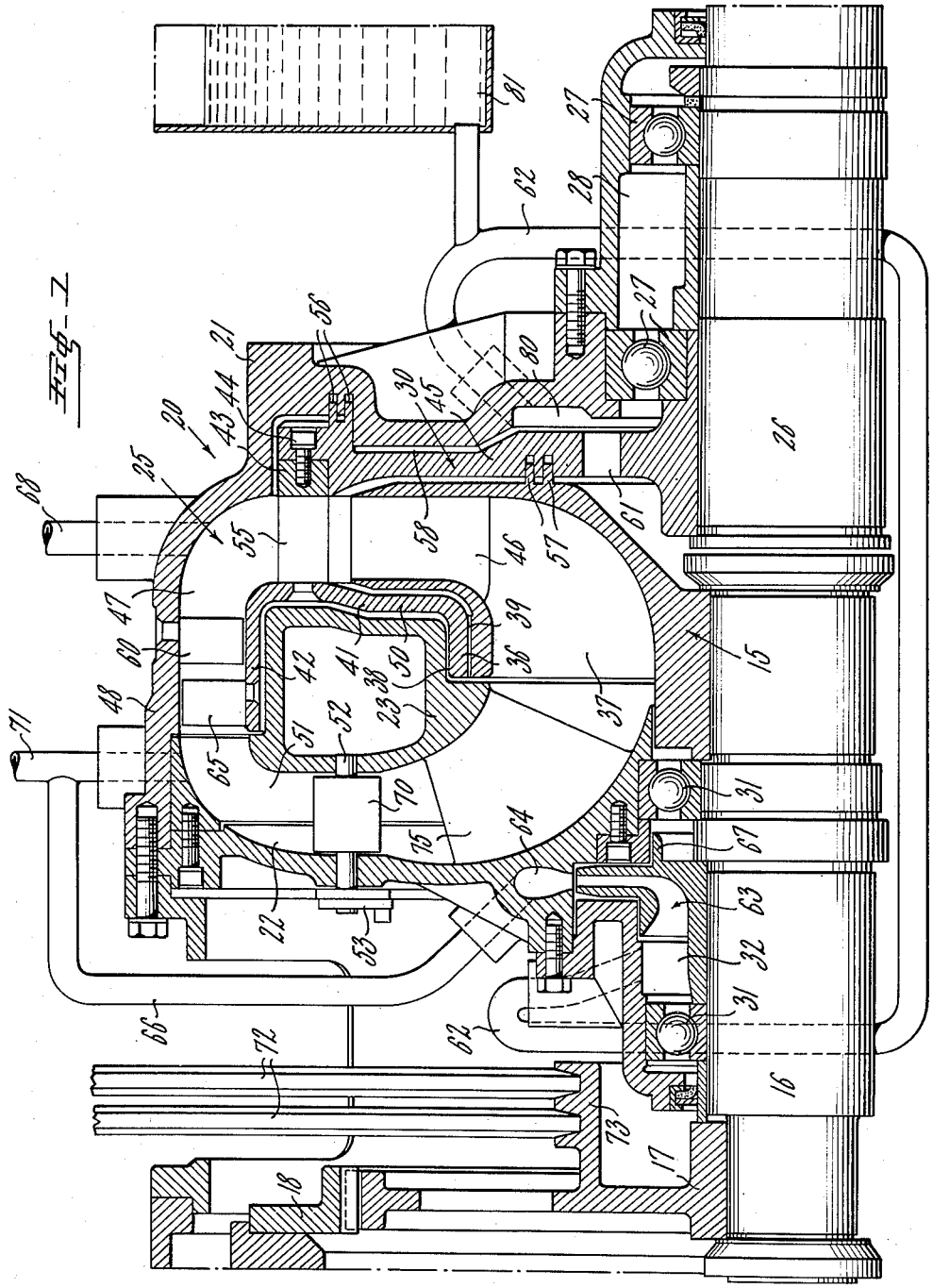

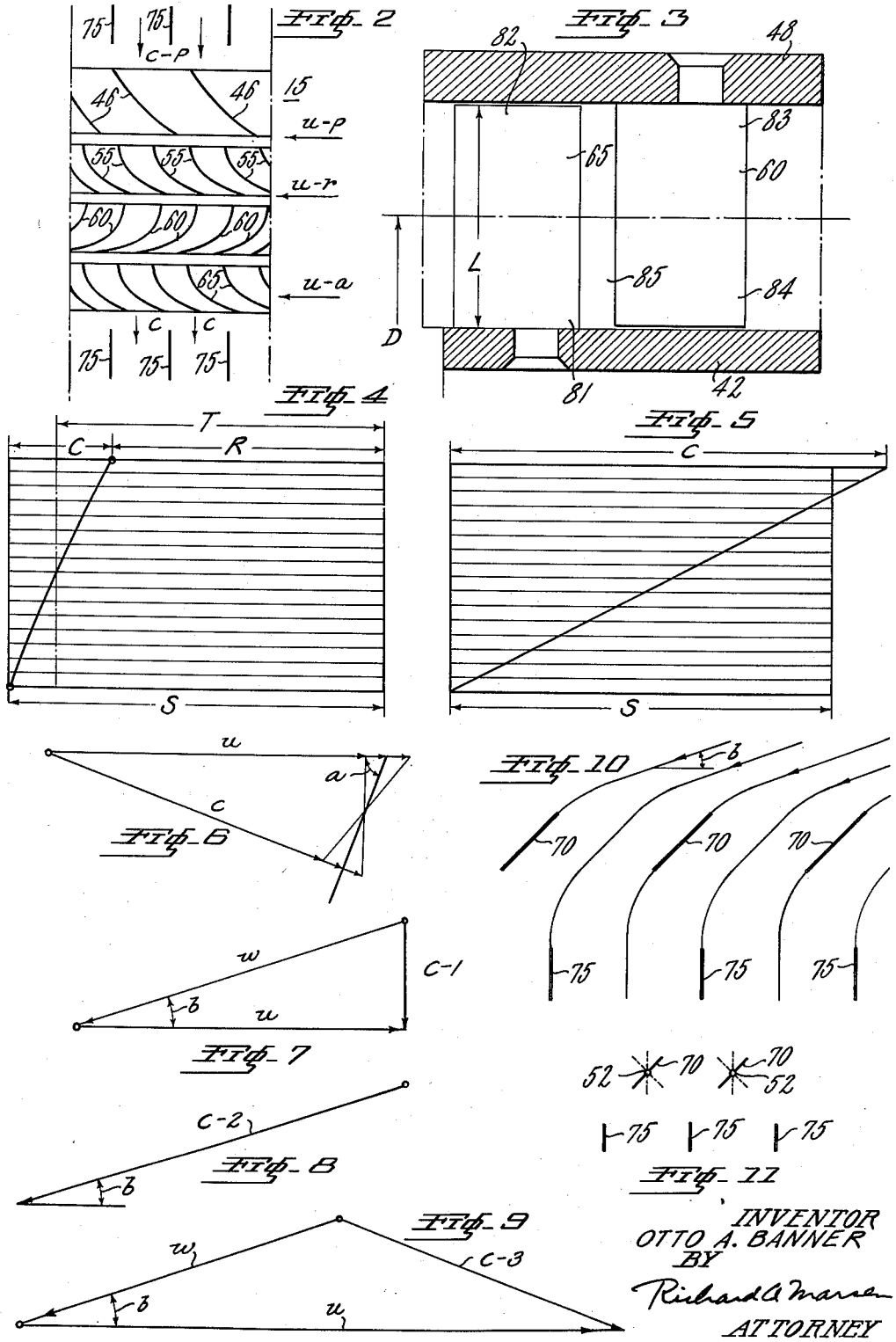

2,578,876

UNITED STATES PATENT OFFICE 2,578,876

HYDRAULIC TORQUE CONVERTER HAVING RADIAL AND AXIAL STAGES

Otto A. Banner, Highland Park, N. J.

Application February 6, 1946, Serial No. 645,863

22 Claims. (Cl. 60—54)

This invention relates to a torque converter, and more particularly to a simple and compact hydraulic transmission having a wide speed range and capable of developing a large stalling torque.

Torque converters of the type contemplated by the present invention include a pump impeller, which is the driving element, a turbine runner which is the driven element, and stationary guide vanes. If the runner includes stages having radically outwardly directed fluid flow, the stalling torque and the range of secondary speeds are increased, as is true also with radially inwardly directed flow. However, when only a single radial stage is used, only a limited stalling torque can be developed. If other radial stages are added, the diameter of the transmission becomes large, and the transmission has other drawbacks. Additionally, torque multiplication in prior converters or hydraulic transmissions has been obtained by the use of two or three-dimensionally developed vanes. The complications of manufacturing such vanes increase the initial cost of the converter by a considerable amount.

It is among the objects of the present invention to provide a hydraulic torque converter having a novel vane arrangement; to provide such a converter including vanes having a pre-determined efficient ratio between their dimensions and their diameters of revolution; to provide such a converter in which friction losses are reduced to a minimum; to provide such an arrangement including adjustable stationary guide vanes for returning the flow to the impeller intake; to provide such a converter including means for superimposing a pre-determined pressure over the pressures normally present in the working circuit of the converter; and to provide a simple, compact, high torque, high efficiency hydraulic torque converter, which is relatively inexpensive to manufacture.

These and other objects, advantages and novel features of the invention will be apparent from the following description and the accompanying drawings. In the drawings:

Fig. 1 is an axial section through a two-stage converter incorporating the present invention.

Fig. 2 is a diagrammatic illustration of the vane arrangement in the converter shown in Fig. 1.

Fig. 3 is a plan view, partly in section, of an axial vane stage of the turbine, illustrating certain dimensional relations.

Fig. 4 is a diagram of the pressures acting through the guide vane channels under rated load conditions.

Fig. 5 is a diagram similar to Fig. 4 under no-load conditions.

Fig. 6 is a diagram of the entrance angle and velocities of the axial runner vanes.

Fig. 7 is a diagram showing the velocity relations of the fluid leaving the axial runner vanes under rated load.

Figs. 8 and 9 are diagrams similar to Fig. 7, under stalling and no-load conditions, respectively.

Fig. 10 is a diagrammatic representation of the fluid flow through a set of intermediate vanes into the return vanes directing the fluid to the impeller intake.

Fig. 11 is a diagrammatic view illustrating the use of adjustable intermediate vanes to direct the fluid flow to the return vanes.

Generally speaking, the present invention includes a casing having driving and driven shafts mounted therein. A pump impeller is mounted on the driving shaft, having an axial intake and a radial discharge. A turbine runner is mounted in the casing, and includes a disk secured to the driven shaft and disposed between the back of the impeller and a radial wall of the casing. The runner also includes means, such as a shroud, disposed on the intake side of the impeller and having a wearing ring overlying the impeller wearing ring, and an outer axial section connected to the wearing ring by a radial section. A set of radial flow runner vanes is connected between the radial shroud portion and the disk, receiving the discharge from the impeller vanes. A set of axial flow stationary guide vanes is mounted within an axial portion of the casing and guides the discharge from the radial runner vanes to a set of axial runner vanes mounted on the outer axial section of the shroud.

In the working circuit of the converter are thus comprised two turbine stages, one axial and one radial. Other axial stages may be added, if preferred, within the scope of the invention. The radial length and entrance and discharge angles of the axial flow vanes on the runner are desirably kept within a pre-determined set of limiting values.

A set of intermediate guide vanes is adjustably mounted in the working circuit to guide the discharge from the turbine runner to the return vanes directing the discharge to the intake of the impeller. Furthermore, for reasons made clear hereinafter, the impeller is provided with thrust wearing rings engaged in the runner disk, and the latter is provided with thrust wearing rings engaged in the radial wall of the casing. The leakage from such rings goes to a common receiving chamber in the casing, from which it is conducted to a pump chamber in the casing. A system pressure pump forces such discharge from the pump chamber into the working circuit, maintaining a system pressure superimposed on the pressures in the working circuit.

Referring more particularly to Fig. 1 of the drawings, the converter includes a pump impeller 15 mounted on a driving shaft 16. Shaft 16 is mounted on bearings 31, 31 between which is a pump chamber 32 described more fully hereinafter. A gear 17 on shaft 16 engages gear teeth on flywheel 18 connected to an engine (not shown). Impeller 15 is mounted in a casing generally indicated at 20 and comprising a main section 21, a cover section 22, and an inner or core section 23. Together with the vane passages, these casing sections cooperate to provide a working circuit generally indicated at 25. A turbine runner, generally indicated at 30, is mounted in casing 20 on a driven shaft 26 supported in bearings 27, 27 in casing section 21. A receiving chamber 80 is formed between casing section 21 and runner 30 having a function which will become clear hereinafter.

Turbine runner 30 includes a disk 45 secured to shaft 26 and a shroud 50 adjacent to core 23. Shroud 50 includes a radial section or skirt 41 disposed between the inside face of impeller 15 and the adjacent surface of core 23. An axial extension 36 of the skirt forms a wearing ring clearance 38 with core 23 and a wearing ring clearance 39 with impeller 15. The shroud also includes an outer axial section 42 generally parallel to the axis of the converter.

The clearance 38 is subject to a fraction of the static pressure of the pump, because the fluid contained between the impeller cover and the skirt 50 rotates at approximately the mean of the speeds of these two elements, thereby generating a centrifugal head which partly counteracts the static pressure of the impeller. This centrifugal head is considerably larger than that which would be generated if the impeller face were rotating in a stationary casing. Thus, the pressure at clearance 39 is considerably reduced by the use of the skirt, and the clearance 39 is subject to a negligible pressure difference, because the fluid contained between the skirt and the stationary casing rotates at about half the turbine speed, which is much smaller than the impeller speed. Therefore, the head generated by this fluid is negligibly small. Skirt 41 thus effectively reduces the wearing ring leakage of the impeller. It also reduces the disc friction losses of the impeller considerably because the relative velocity between impeller and skirt is much smaller than between impeller and casing core.

A ring 43, secured by bolts 44 to the periphery of disk 45, supports a series of radial flow turbine or runner vanes 55, secured at their inner side to radial section 41 of shroud 50. Vanes 55 receive the discharge from vanes 46 of impeller 15 and direct their discharge into portion 47 of working circuit 25. A set of stationary guide vanes 60, secured to axial section 48 of casing 20, directs fluid from working circuit section 47 onto axial flow runner vanes 65 mounted on axial extension 42 of shroud 50.

The discharge from vanes 65 is directed into section 51 of working circuit 25, from which intermediate axial flow guide vanes 70 direct the flow to stationary return vanes 75, which latter return the flow to intake 37 of impeller 15. For a purpose to be described hereinafter, vanes 70 are secured to shafts 52 rotatably mounted in sections 22 and 23 of casing 20. Cranks 53 are provided on shafts 52 so that vanes 70 are adjustable about the axes of shafts 52.

Balancing of the end-thrust of turbine runner 30 is provided by thrust wearing rings 56 engaged in casing section 21. Similarly, the impeller is balanced by thrust wearing rings 57 engaged in disk 30. The leakage from rings 56 passes into receiving chamber 80, and that from rings 57 passes through apertures 61 into receiving chamber 80. A pipe 62 communicating with chamber 80 conducts the leakage discharge into pump chamber 32.

An auxiliary centrifugal pump 63 is mounted on shaft 16 and discharges fluid from pump chamber 32 into volute 64 from which a pipe 66 conducts the leakage back to section 51 of working circuit 25. Pipe 62 is connected to a tank 81 (as shown diagrammatically), which is open to the atmosphere. Accordingly, chambers 80 and 32 are kept under a pressure which is quite close to atmospheric.

In order to maintain the temperature of the working fluid within safe limits, it is necessary to cool it. For this purpose, fluid is taken from section 47 of the working circuit by a pipe or conduit 68, passed through a cooler (not shown) and returned through pipe 71 to section 51 of the working surface. Thus the pressure drop across the axial stage of the turbine is made available for overcoming the resistance of the cooler. The fan for the cooler is operated by a V-belt drive 72 engaging a driving sheave 73 attached to or formed integral with gear coupling 17. The cooler fan is thus driven by the engine flywheel 18. The pressure in the intake 37 of the impeller is not much different from that in section 51 of the working circuit at rated conditions, but is higher at stalling and no-load conditions. For this reason, the cooler and system pump discharges are led to the section 51 where the pressure is low under all conditions.

The centrifugal pump 63 serves as a pressure breakdown between circuit 25 and the intake chamber 32 of the pump, whereby the pressure in the chamber 32 may be held at atmospheric level. As described, the leakage from the impeller and the runner thrust wearing rings is used as fluid for this auxiliary pump, which latter acts to superimpose a system pressure over the pressures in the working circuit, to suppress cavitation which may occur when the converter operates under conditions other than rated. To maintain the system pressure, the fluid supply for the centrifugal pump may be supplemented, if necessary, by fluid taken from a point of low pressure in the working circuit.

The arrangement of the flow in the converter may be best understood by reference to Fig. 2. The flow passes from return vanes 75 through intake 37 of impeller 15 to vanes 46 of the impeller. The return vanes 75 are preferably located in radial planes, and the fluid leaving these vanes has a velocity $c-p$. The flow from impeller vanes 46 is discharged into the radial runner vanes 55. From thence, the flow is discharged into axial guide vanes 60 of the casing, which direct the flow to axial vanes 65 of the turbine runner. These latter discharge the fluid through intermediate guide vanes 70 (not shown in Fig. 2) into return vanes 75. For purposes of later reference, the peripheral velocity of the impeller is denoted as $u-p$, of the radial vanes 55 as $u-r$ and of the mean diameter of axial vanes 65 $u-a$.

Simplicity of the turbine structure is effected by the use of singly curved vane shapes having constant inlet and discharge angles, such as used in the Parsons steam turbines. Such vane shapes may be produced by drawing, extruding, milling, or similar processes.

Similarly, the combination, as in the present invention, of a purely radial stage with a purely axial stage discharging into a stationary return channel having vanes leading the flow in a well organized fashion from the axial turbine has many advantages. For instance, it raises the stalling torque by converting the vane discharge velocity into pressure, widens the range of driven speeds by fully utilizing the centrifugal head produced by the radial stage, and delivers the flow always in the same direction. This latter is important, when it is considered that it is common practice to discharge the flow from the last turbine stage directly into the impeller, resulting in a return flow reaching the impeller vanes with an angular momentum varying from a high negative value at stalling, through zero value at rated speed, to a high positive value at no-load. Consequently, the motor is overloaded at stalling and underloaded at no-load. All this is avoided by the present design which always delivers the flow through the impeller in the same direction.

In the present design, the inner leakage losses of the converter are negligible and the outer leakage losses may be held to an exceedingly small amount. In order to obtain maximum efficiency, the vane opening angles should be sufficiently large, the direction of flow leaving the runner vanes should be substantially perpendicular with the plane including the vane ends in order to reduce unnecessary rotational components to a minimum, and the ratio of tip clearance to vane length should be as small as consistent with safe operation.

All these criteria are easily met in the radial stage but complications arise in attempting to meet them in the axial stage. For instance, if the stationary guide vanes 60 were arranged directly behind the axial flow vanes 55 (Fig. 1) in the elbow 47 in working circuit 25, it would be possible to shorten and strengthen axial extension 42 of shroud 50. However, this would require vanes 60 to have a double curved or "Francis type" design, would increase the diameter of the converter, would require exceedingly close maintenance of adjustment, and would result in an irregular flow due to uneven pressure distribution and turbulence caused by the centrifugal pressures in the flow. Additionally, Francis type vanes do not compare in efficiency with straight vanes of prismatic or singly curved, or "Parsons type" designs. Flow losses through standard elbows are much greater than through straight pipes of the same length. But the research by Nippert has demonstrated that, when the elbow flow is accelerated, the losses are reduced to the lowest found in any flow, such as in converging pipes or nozzles. Acceleration of the flow is obtained in my converter when the limits of the second stage vane length are adopted which are explained later. Accordingly, excellent results are obtained by placing the guide vanes 60 in the axial part of the working circuit.

The return portion 51 of working circuit 25 introduces another problem. The velocity head of the flow leaving axial turbine vanes 65 is a total loss as far as the turbine is concerned and thus as much as possible of this head should be recovered in the pump impeller. The absolute velocity of the flow before entering impeller pump vanes 46 may be varied within reason. However, the absolute velocity of the flow leaving runner vanes 65 must be limited to minimize losses. To effectively accomplish this, the radial length of the axial stage vanes 65 must bear a certain relationship to the area of intake 37. Another factor must be considered, namely that the runner vanes 65 impose a centrifugal pressure in the fluid gap separating them from the guide vanes 60.

Referring to Fig. 3, which illustrates vanes 60 and 65, casing section 48 and shroud section 42, the root of vanes 65 is indicated at 81 and the tip at 82. Similarly, the root of guide vanes 60 is indicated as at 83 and the tip at 84. The gap between vanes 60 and 65 is shown at 85. The radial length of vanes 65 is denoted L, the mean radius of revolution is D, which represents the diameter of the cylinder containing the axial meridian lines passing through the center of the length L of the vanes 65.

Fig. 4 illustrates the pressures available for the acceleration of flow through the guide vanes. The pressure in advance of the guide vanes is S, which is to all intents and purposes uniform because the flow approaching guide vanes 60 has a low velocity. The centrifugal pressure set up by runner vanes 65 in gap 85 is zero at tip 84 and C at root 83. It will be seen that pressure S is reduced to R at the root of guide vanes 60 and to T at the center of the guide vanes. Consequently, the discharge velocity from vanes 60 is increased at the tip and decreased at the root. At the same time, the peripheral velocity of turbine vanes 65 is larger at their tips and smaller at their roots as compared with the velocity at the means radius of revolution D. For example, with the present invention, the runner vanes and the intermediate guide vanes are curved in only one direction, or are generally of a cylindrical shape. The fluid passing through the radial vanes acquires their rotative velocity whereby a centrifugal head is generated which increases the relative velocity by amounts equalling stalling and maximum at no load conditions, whereby it helps to extend the range of the secondary speed. The flow conditions in this stage are close to ideal, and the static pressures before and after it are evenly distributed.

The axial runner stage operates under entirely different conditions. If the diameter of the cylindrical surface embracing the axially disposed meridional flow lines passing through the centers of the length L of the runner vanes 65 is denominated as D (see Fig. 3) then the root circle diameter is $D-L$, and the tip circle diameter $D+L$. The corresponding circumferential velocities are: $u_r$ at the root, $u$ at the center, $u_t$ at the tip of the vanes 65. Since the fluid in the vane channels 65 rotates with the velocity of the vanes, centrifugal heads are created in this fluid which are:

$$\frac{1}{2g}(u_t{}^2 - u_r{}^2) = C$$

at the tip, $$\frac{1}{2g}(u^2 - u_r{}^2) \cong \frac{C}{2}$$

at D, and zero at the root, of vane 65. If reference shall be made to the conditions at the preceding guide vanes 60, then the root 81 of vane 65 corresponds to the tip 84 of vane 60, and the tip 82 of vane 65 to the root 83 of vane 60. The heavy line in the graph of Fig. 4 shows the distribution of these forces over the length of the vane channel 65. These centrifugal heads have the following three effects: (1) they create a flow of fluid from the root to the tip in the channels of vanes 65; (2) they maintain pressures in the gap 85 between the running vanes 65 and the stationary vanes 60 which are equal on every radius to the pressures inside of the channels 65. These pressures reduce the static head in the channel 85 as shown in Fig. 4: the available static head is S, this is shown in full force at the tip 84 of vane 60 because there is no centrifugal force active at the point; but at the root 83 of vane 60 this static head S is reduced by the amount C of the centrifugal head, so that only the amount R remains available for producing the exit velocity $c_r$ leaving the guide vanes 60. The curve of the C's shows how much the static head is reduced on every radius. (3) They act in the same amount on each radius, but in the opposite direction in the channels of the vanes 65 on the side of the return channel. Here their action is such that they increase the relative exit velocities in the vane channels 65.

An important consequence of the action of these centrifugal forces is their influence on the entrance angles of the vanes 65. Fig. 6 shows the three absolute velocities $c_r$, $c$, and $c_t$ of the flow discharged from the guide vanes 60 together with the corresponding circumferential velocities $u_r$, $u$, and $u_t$. It is seen that in order to obtain deflectionless entrance into the vane channels, the vane inlet angles must vary from $a_r$, (at the root), to $a$ (at the meridian median flowline), to $a_t$ (at the tip of the running vanes), the stationary vanes having constant discharge angles.

To what extraordinary conditions this action of the centrifugal forces may lead is seen from Fig. 5 where the speed of rotation has been doubled as will happen with a smaller reduction ratio and no-load speed resulting in four times the centrifugal head on each radius. In this case the vane angle $a_r$ would be so small that no fluid could enter at the tip 82 of the running vanes.

It is further seen that more fluid enters the bottom half of the runner vanes 65 than the upper half. This excess is moved from the lower to the upper half by the centrifugal forces acting inside of the vane channels 65. This secondary flow leads, of course, to hydraulic losses.

With molded vanes, it is easy to take care of the variation of the inlet angles over the length of the vanes, but these molded vanes are very expensive to manufacture. Accordingly, it is desirable if possible to use cylindrical or singly curved vanes. This necessitates a compromise limiting the length L and exit angles $a$ of the axial stage vanes 65, in order to hold the losses, due to the resulting deflection and secondary flow, within reasonable limits.

In order to obtain high torque ratios it is essential to give the axial vanes small exit angles. This leads to long vanes 65. On the other hand the horsepower output of the converter is limited by the rate of flow through the circuit, which in turn is limited by the eye area of the impeller. The entrance velocity into the impeller vanes must be held within the limits of good practice, dictated by the desired head and efficiency characteristics of the pump impeller. These conditions generally require long vanes or large vane angles or both.

Thus a compromise must be made between all of these desiderata. Considerations of price competition, space limitation, permissible weight, etc., call for small units. High stall torques and wide ranges require high efficiencies which are predicated on excellent pump performance, which can only be had with appropriate specific speeds, on a judicious distribution of the torques developed by the two turbine stages at rated load, and on reducing all flow losses in and between the different operating stages. I have found that the difficulties created by these involved and even contradictory conditions can be successfully met by holding the length and the discharge of the second turbine stage within certain limits. Torque converters designed according to them give extraordinarily high stalling torques and at the same time wide speed ranges that cannot be met by any other two-stage converter.

In accordance with the principles of the present invention, I have found that the use of axial running vanes having a length of from 4.1% to 9.6% of the mean radius of revolution of the vanes, and having exit angles of from 12.5° to 30°, will produce the most satisfactory all around results, insofar as the over-all efficiency of the converter is concerned. With such design factors, the proper conditions for the entrance to the impeller can be met even with wide variations in the intake area. Furthermore, the flow conditions in the return channel 51 are satisfactory. Of course, the length-mean radius ratio and the vane angles will vary with the torque ratios, power, speed and impeller designs of the converter, within the limits set forth. When these dimensional limitations are met, stall torques as high as eight times the primary torque, and clutch point ranges as high as 65% to 70% of the primary speed, may be obtained with stationary return guide vanes. These figures may be improved, when the stationary vanes are preceded by a set of adjustable vanes, as described later.

The axial stage will not be quite as efficient as the radial stage, but when the limitations as to length of vanes and vane exit angles are observed, the efficiency of this stage will still be found to be better than that of "Francis" stages. When the axial stage is considered in connection with the return channel, it is seen that this slight decrease in efficiency at rated load is largely compensated by the great gain in stalling torque, especially when the return channel vanes are equipped with means to reduce the deflection loss of the flow entering the vanes. The particular method shown is exemplary only, as there are other ways of accomplishing these results. The present method consists in the arrangement of fixed vanes 75 in the return channel 22 which discharge the flow under a fixed angle into the eye of impeller 46, cooperating with adjustable vanes 70 which direct the flow to the fixed vanes. These adjustable vanes may be independent structures or designed as adjustable ends of the fixed vanes. Hand in hand with the reduction of the deflection loss goes a recovery of velocity head. This recovered adds to the pump head causing a larger rate of flow in the circuit. This, in turn, results in an increase of secondary torque.

The action of the adjustable vanes is very effective. Fig. 7 shows the exit velocity diagram of the axial vanes for rated conditions. The relative exit velocity is $w$, the peripheral velocity $u$, the absolute velocity of the fluid delivered to the return channel $c-1$. This latter is preferably arranged at right angles to $u$ in order to avoid unnecessary rotational components. When the turbine stalls, $u$ becomes zero and the relative velocity becomes the absolute velocity. It has the direction of $w$, but is much larger. Fig. 8 shows the new conditions. Assuming a vane exit velocity, $c-2$, of 100 ft./sec. a vane discharge angle $b$ of 20°, and radial alignment of the return vanes, then the horizontal component of c—2 may be used for estimating the loss created by the disturbance of the flow due to the deflection. In the present case this component is found to be 94 ft./sec. corresponding to a head of 137 ft. With sufficiently widely spaced vanes, a loss coefficient of 0.8 looks safe, so that the loss incurred by the deflection disturbance would be 110 ft. But when adjustable vanes 70 are placed between the axial turbine vanes 65 and the fixed vanes 75 and these vanes are so adjusted that the total component is cut in half, then the head of each half would be only 34.3 ft. Due to much more favorable entrance angles (see Fig. 10) the loss coefficient will be smaller and may safely be taken as 0.65, so that the loss of each half is only about 22.3 ft. or 44.6 for both. Adding a surface friction loss of 6.8 ft. for the flow through the adjustable vanes, the total loss would be 51.4 ft. Thus the loss of head in the second case appears to be only 44.7% of the loss in the first case.

For example, with the present invention, the runner vanes and the intermediate guide vanes are curved in only one direction, or are generally of a cylindrical shape. The fluid passing through the radial vanes acquires their rotative velocity whereby a centrifugal head is generated which increases the general exit velocity. The addition of this head to the static head of the impeller becomes important when the runner nears no-load speed, as it helps to extend the range of the secondary speed. The flow conditions in this stage are close to ideal, and the static pressures before and after it are evenly distributed.

The axial runner stage operates under entirely different conditions. If the diameter of the cylindrical surface embracing the axially disposed meridional flow lines passing through the center of the length L of the runner vanes 65 is denominated as D (see Fig. 3) then the root circle diameter is $D-L$, and the tip circle diameter $D+L$. The corresponding circumferential velocities are: $u_r$ at the root, $u$ at the center, $u_t$ at the tip of the vanes 65. Since the fluid in the vane channels 65 rotates with the velocity of the vanes, centrifugal heads are created in this fluid which are:

$$\frac{1}{2g}(u_t^2-u_r^2)=C$$

at the tip, $$\frac{1}{2g}(u^2-u_r^2)\cong\frac{C}{2}$$

at D, and zero at the root, of vane 65. If reference shall be made to the conditions at the preceding guide vanes 60, then the root 81 of vane 65 corresponds to the tip 84 of vane 60, and the tip 82 of vane 65 to the root 83 of vane 60. The heavy line in the graph of Fig. 4 shows the distribution of these forces over the length of the vane channel 65. These centrifugal heads have the following three effects: (1) they create a flow of fluid from the root to the tip in the channels of vanes 65; (2) they maintain pressures in the gap 85 between the running vanes 65 and stationary vanes 60, which are equal on every radius to the pressures inside of the channels 65. These pressures reduce the static head in the channel 85 as shown in Fig. 4: the available static head is S, this is shown in full force at the tip 84 of vane 60, because there is no centrifugal force active at the point; but at the root 83 of vane 60 this static head S is reduced by the amount C of the centrifugal head, so that only the amount R remains available for producing the exit velocity $c_r$ leaving the guide vanes 60. The curve of the C's shows how much the static head is reduced on every radius. (3) They act in the same amount on each radius, but in the opposite direction in the channels of the vanes 65 on the side of the return channel. Here their action is such that they increase the relative exit velocities in the vane channels 65.

The most important consequence of the action of these centrifugal forces is their influence on the entrance angles of the vanes 65. Fig. 6 shows the three absolute velocities $c_r$, $c$, and $c_t$ of the flow discharged from the guide vanes 60 together with the corresponding circumferential velocities $u_r$, $u$, and $u_t$. It is seen that in order to obtain deflectionless entrance into the vane channels, the vane inlet angles must vary from $a_r$ (at the root), to $a$ (at the meridian median flowline), to $a_t$ (at the tip of the running vanes), the stationary vanes having constant discharge angles.

To what extraordinary conditions this action of the centrifugal forces may lead is seen from Fig. 5 where the speed of rotation has been doubled as will happen with a smaller reduction ratio and no-load speed resulting in four times the centrifugal head on each radius. In this case the vane angle $a_r$ would be so small that no fluid could enter at the tip 82 of the running vanes.

It is further seen that more fluid enters the bottom half of the runner vanes 65 than the upper half. This excess is moved from the lower to the upper half by the centrifugal forces acting inside of the vane channels 65. This secondary flow leads, of course, to hydraulic losses.

With molded vanes, it is easy to take care of the variation of the inlet angles over the length of the vanes, but these molded vanes are very expensive to manufacture. Accordingly, it is desirable if possible to use cylindrical or singly curved vanes. This necessitates a compromise limiting the length L and exit angles $a$ of the axial stage vanes 65, in order to hold the losses, due to the resulting deflection and secondary flow, within reasonable limits.

In order to obtain high torque ratios it is essential to give the axial vanes small exit angles. This leads to long vanes 65. On the other hand the horsepower output of the converter is limited by the rate of flow through the circuit, which in turn is limited by the eye area of the impeller. The entrance velocity into the impeller vanes must be held within the limits of good practice, dictated by the desired head and efficiency characteristics of the pump impeller. These conditions generally require long vanes or large vane angles or both.

Thus a compromise must be made between all of these desiderata.

The axial stage will not be quite as efficient as the radial stage, but when the limitations as to length of vanes and vane exit angles are observed the efficiency of this stage will still be found to be better than that of "Francis" stages. When the axial stage is considered in connection with the return channel, it is seen that this slight decrease in efficiency at rated load is largely compensated by the great gain in stalling torque, especially when the return channel vanes are equipped with means to reduce the deflection loss of the flow entering the vanes. The particular method shown is exemplary only, as there are other ways of accomplishing these results. The present method consists in the arrangement of fixed vanes 75 in the return channel 22 which discharge the flow under a fixed angle into the eye of impeller 46, cooperating with adjustable vanes 70 which direct the flow to the fixed vanes. These adjustable vanes may be independent structures or designed as adjustable ends of the fixed vanes. Hand in hand with the reduction of the deflection loss goes a recovery of velocity head. This recovered head adds to the pump head causing a larger rate of flow in the circuit. This, in turn, results in an increase of secondary torque.

The action of the adjustable vanes is very effective. Fig. 7 shows the exit velocity diagram of the axial vanes for rated conditions. The relative exit velocity is $w$, the peripheral velocity $u$, the absolute velocity of the fluid delivered to the return channel $c-1$. This latter is preferably arranged at right angles to $u$ in order to avoid unnecessary rotational components. When the turbine stalls, $u$ becomes zero and the relative velocity becomes the absolute velocity. It has the direction of $w$, but is much larger. Fig. 8 shows the new conditions. Assuming a vane exit velocity, $c-2$, of 60 ft./sec., a vane discharge angle $b$ of 20°, and radial alignment of the return vanes, then the horizontal component of $c-2$ is the deflection loss component. In this present case this is found to be 56.4 ft./sec., corresponding to a head of 49.5 ft. With sufficiently widely spaced vanes, a loss coefficient of 0.9 (at best) will obtain, so that the loss of head would be 44.6 ft. and the resulting recovery 49.5-44.6 or 4.9 ft. But when adjustable vanes 70 are placed between the axial turbine vanes 65 and the fixed vanes 75 and these vanes are so adjusted that the total deflection component of 56.4 ft. is cut in half, then the head of each half would be about 12.4 ft. Due to much more favorable entrance angles (see Fig. 10) the loss coefficient will be much smaller and may safely be taken as 0.65, so that the loss of each half is only about 8.1 ft. or 16.2 ft. for both. Adding a surface friction loss of 3.8 ft. for the flow in the adjustable vanes 70, the total loss would be 20 ft. and the recovery 49.5-20 or 29.5 ft. Thus in the first case 10%, and in the second 60%, of the deflection component head is recovered.

Fig. 5 illustrates the pressure conditions in guide vanes having a greater length L and under no-load conditions. It will be noted that the pressure C set up in gap 35 by the runner vanes, at the root of the guide vanes, is greater than the pressure in advance of the guide vanes, S. In effect, there is a return flow in the channels at the roots of the guide vanes under no-load conditions which seriously affects their performance adversely.

Fig. 6 is a diagram of the velocities and the resultant inlet angles required for smooth entrance of the flow into the channels of the axial flow turbine vanes 65. The peripheral velocities of the vanes are indicated at $u$, and the absolute velocities of the fluid, as delivered by the guide vanes 60, at $c$. The vane angle at the mean radius D (Fig. 3) of vane 65 is indicated as $a$. It will be noted that the vane angle varies a considerable amount from the root to the tip of vanes 65. It is difficult and expensive to produce vanes having varying inlet angles, whereas it is quite simple to produce excellently finished and accurate vanes having constant inlet and discharge angles over their entire length.

As a specific example, Fig. 6 represents the entrance conditions for the axial runner vanes 65 of a 140 H. P. converter operating at 1600 R. P. M. and having a speed ratio of 2.4 at rated conditions. In these vanes, the entrance angle $a$ is constant over the entire length, as is also the discharge angle thereof. Additionally, the entrance and discharge angles of the guide vanes 60 are constant over the entire length of such vanes. In such specific example, the hydraulic efficiency in the axial stage is 94%, with a deflection loss of 2.14%. The latter, which is due to the deflection of the flow, is integrated over the length of the vane. It will be seen that the use of constant angle vanes thus reduces the efficiency of the axial runner vanes to 91.86%. In the specific example shown in Fig. 6, there is practically no acceleration of the flow in the return channel of the working circuit. The length of axial runner vanes 65 is 6.4% of their mean radius of revolution. If the length is increased to 8% of such mean radius, and the discharge angle simultaneously reduced, the deflection losses rise to 2.35%, but acceleration takes place in the return channel. The by-pass loss over the vane tips is practically the same in both cases.

The centrifugal force acting on the fluid between the roots 81 and the tips 82 within the channels of runner vanes 65 propels the fluid from the roots to the tips. Thus a secondary, radially outwardly directed flow is set up in the vane channels which constitutes an additional loss in this stage of the turbine.

It will thus be apparent that the flow conditions in return channel 51 are governed by the flow conditions in the channels of axial running vanes 65, and that the designs of the vanes and of the return channel must be coordinated to raise the converter efficiency to the highest level. The most important factors in this respect are the vane length and the vane angles.

At rated load, the direction of the flow leaving axial running vanes 65 is axial, or substantially axial. Fig. 7 is the velocity diagram, in which the relative velocity of the fluid passing through the discharge area of the vane channels is indicated at $w$, the peripheral velocity at $u$, the vane discharge angle at $b$, and the absolute velocity at rated load is $c-1$. When the vanes 75 in return channel 51 are in axial planes, their return flow enters the vane channels without having a deflection component.

The flow conditions, when the runner is stalled are shown in Fig. 8. The velocity $u$ is zero and the absolute velocity $c-2$ has the direction of the vane exit angle $c$. The flow then hits the stationary return vanes at an acute angle.

A similar condition exists when the converter is running at no-load, as illustrated in Fig. 9. In this case the peripheral velocity $u$ is much greater than rated and the absolute velocity under no-load $c-3$ has a considerable deflection component when entering return channel vanes 75. However, the deflection component in this case is in the opposite direction from the deflection component under stalling conditions.

In order to reduce the losses due to these deflection components, the intermediate vanes 70 are interposed between the discharge portion 51 of working circuit 25 and the fixed return vanes 75. Vanes 70 are appropriately spaced and inclined so that a smooth flow may result as shown in Fig. 10, which depicts the stalling conditions of Fig. 8. The flow leaving axial vanes 65 has an angle of inclination b. Before entering the channels of intermediate vanes 70, the flow bends so as to enter the channel smoothly. Also, the flow leaving the channels of intermediate vanes 70 bends to enter the channels of fixed vanes 75 smoothly. Experience indicates that the use of intermediate vanes 70 results in considerable savings due to reduction of deflection losses.

In order to adapt intermediate vanes 70 so that they may also receive the flow from axial vanes 65 smoothly at no-load, vanes 70 are made adjustable as by mounting on axles 52 (Fig. 1). The vane arrangement is indicated diagrammatically in Fig. 11, which illustrates the relation of intermediate vanes 70 to fixed vanes 75. As stated, cranks 53 are provided on axles 52 so that adjustment of vane 70 may be easily effected in any desired manner.

The described invention thus provides a high torque ratio, efficient hydraulic converter including a radial stage and one or more axial stages. The resulting converter has a relatively small over-all diameter particularly adapting it for use in automotive drives. The converter may be inexpensively manufactured as all of the vanes are two-dimensional and may be formed by drawing, extruding, or the like. The provision of the adjustable intermediate vanes 70 results in an effective reduction of deflection losses in the return channel of the working circuit.

While a specific embodiment of the invention has been shown and described to illustrate the application of the principles thereof, it will be understood that the invention may be otherwise embodied without departing from such principles.

What is claimed is:

1. A hydraulic torque converter comprising, in combination, a stationary outer casing having a core and enclosing a working circuit; a radial pump impeller rotatably mounted in said casing and having an axial intake; a turbine runner rotatably mounted in said casing in operative association with said impeller; a set of solely radial flow vanes on said runner arranged to receive fluid discharged from said impeller; a set of axial flow guide vanes in said casing arranged to receive fluid discharged from said radial flow vanes; a set of axial flow vanes on said runner arranged to receive fluid discharged from said guide vanes; and means in the casing for axially receiving fluid discharged from the axial flow vanes of said runner and directing such fluid axially to the impeller intake at a fixed angle.

2. A hydraulic torque converter comprising, in combination, a stationary outer casing having a core and enclosing a working circuit; a radial pump impeller rotatably mounted in said casing and having an axial intake; a turbine runner rotatably mounted in said casing in operative association with said impeller; a set of radial flow vanes on said runner arranged to receive fluid discharged from said impeller; a set of solely axial flow guide vanes in said casing arranged to receive fluid discharged from said radial flow vanes; a set of axial flow vanes on said runner arranged to receive fluid discharged from said guide vanes; and means, including a return channel in the casing having other guide vanes, for axially receiving fluid discharged from the axial flow vanes of said runner and directing such fluid axially to the impeller intake at a constant angle.

3. A hydraulic torque converter comprising, in combination, a stationary outer casing having a core and enclosing a working circuit; a radial pump impeller rotatably mounted in said casing and having an axial intake; a turbine runner rotatably mounted in said casing in operative association with said impeller; a set of radial flow vanes on said runner arranged to receive fluid discharged from said impeller; a set of axial flow guide vanes in said casing arranged to receive fluid discharged from said radial flow vanes; a set of solely axial flow vanes on said runner arranged to receive fluid discharged from said guide vanes; and means, including a return channel in the casing having other solely axial flow guide vanes adjustably mounted therein, for receiving fluid discharged from the axial flow vanes of said runner and fixed guide vanes receiving the flow from the adjustable vanes and directing such fluid axially to the impeller intake at a fixed angle.

4. A hydraulic torque converter comprising, in combination, a stationary outer casing having a core and enclosing a working circuit; a radial pump impeller rotatably mounted in said casing and having an axial intake; a turbine runner rotatably mounted in said casing in operative association with said impeller; a set of singly curved radial flow vanes on said runner arranged to receive fluid discharged from said impeller; a set of singly curved axial flow guide vanes in said casing arranged to receive fluid discharged from said radial flow vanes; a set of singly curved axial flow vanes on said runner arranged to receive fluid discharged from said guide vanes, the radial length of said runner axial flow vanes being in the range not less than 4.1% and not more than 9.6% of their mean radius of revolution; and a return channel in said casing for receiving fluid discharged from the axial flow vanes of said runner and directing such fluid axially to the impeller intake at a fixed angle.

5. A hydraulic torque converter comprising, in combination, a stationary outer casing having a core and enclosing a working circuit; a radial pump impeller rotatably mounted in said casing and having an axial intake; a turbine runner rotatably mounted in said casing in operative association with said impeller; a set of singly curved radial flow vanes on said runner arranged to receive fluid discharged from said impeller; a set of singly curved axial flow guide vanes in said casing arranged to receive fluid discharged from said radial flow vanes; a set of singly curved axial flow vanes on said runner arranged to receive fluid discharged from said guide vanes, the discharge angle of said runner axial flow vanes being in the range not less than 12½° and not more than 30°; and a return channel in the casing for axially receiving fluid discharged from the axial flow vanes of said runner and directing such fluid axially to the impeller intake at a fixed angle.

6. A hydraulic torque converter comprising, in combination, a stationary outer casing having a core and enclosing a working circuit; a radial pump impeller rotatably mounted in said casing and having an axial intake; a turbine runner rotatably mounted in said casing in operative association with said impeller; a set of singly curved radial flow vanes on said runner arranged to receive fluid discharged from said impeller; a set of singly curved axial flow guide vanes in said casing arranged to receive fluid discharged from said radial flow vanes; a set of singly curved axial flow vanes on said runner arranged to receive fluid discharged from said guide vanes, the radial length of said runner axial flow vanes being in the range not less than 4.1% and not more than 9.8% of their mean radius of revolution and the discharge angle of said runner axial flow vanes being in the range not less than 12½° and not more than 30°; and a return channel in said casing for axially receiving fluid discharged from the axial flow vanes of said runner and directing such fluid axially to the impeller intake at a fixed angle.

7. A hydraulic torque converter comprising, in combination, a stationary outer casing having a core and enclosing a working circuit; a radial pump impeller rotatably mounted in said casing on a shaft and having an axial intake; a turbine runner rotatably mounted in said casing and including a disk located between said impeller and a radial wall of said casing; a set of vanes on said runner arranged to receive fluid discharged from said impeller; means for receiving fluid discharged from said runner and directing such fluid to the impeller intake; thrust wearing rings on the back of said impeller engaging said disk; thrust wearing rings on the back of said disk engaging said casing wall; a collecting chamber in said casing between said radial wall and said disk; means including apertures in said disk for discharging leakage from said rings into said chamber; a pump chamber in said casing; means interconnecting said chambers; a pump having an intake in said pump chamber and driven by the impeller mounting shaft; and means connecting the discharge of said pump to said working circuit; said pump acting as a pressure breakdown between said pump chamber and said working circuit.

8. A hydraulic torque converter comprising, in combination, a stationary casing having inner and outer sections enclosing a working circuit; a pump impeller rotatably mounted in said casing and having an axial intake and radial discharge vanes; a turbine runner rotatably mounted in said casing and including a disk located between said impeller and a radial wall of said casing and shroud means including an axial section surrounding the impeller intake and a radial section adjacent the discharge portion of said impeller and spaced axially from and parallel to said disk; radial flow vanes mounted between said shroud means radial section and said disk and receiving fluid discharged from the impeller discharge vanes; and a return channel formed by the outer and inner casing sections for receiving fluid discharged from said runner and directing such fluid axially to the impeller intake.

9. A hydraulic torque converter comprising, in combination, a stationary casing having inner and outer sections enclosing a working circuit; a pump impeller rotatably mounted in said casing and having an axial intake and radial discharge vanes; a turbine runner rotatably mounted in said casing and including a disk located between said impeller and a radial wall of said casing and shroud means including an inner axial section surrounding the impeller intake, and an outer axial section connected to the inner axial section by a radial section adjacent the discharge portion of said impeller and spaced axially from and parallel to said disk; a set of axially extending, singly curved radial flow vanes mounted between said shroud means radial section and said disk and receiving fluid discharged from the impeller discharge vanes; a set of axial flow guide vanes extending radially from the outer section of said casing toward said outer axial shroud section, arranged to receive fluid discharged from said radial flow vanes; a set of axial flow vanes mounted on said shroud means outer axial section and receiving fluid discharged from said casing vanes; and a return channel formed by the outer and inner casing sections for receiving fluid discharged from the axial flow vanes of said runner and directing such fluid axially to the impeller intake.

10. A hydraulic torque converter comprising, in combination, a stationary casing having inner and outer sections enclosing a working circuit; a pump impeller rotatably mounted in said casing and having an axial intake and radial discharge vanes; a turbine runner rotatably mounted in said casing and including a disk located between said impeller and a radial wall of said casing and shroud means including an inner axial section surrounding the impeller intake, and an outer axial section connected to the inner axial section by a radial section adjacent the discharge portion of said impeller and spaced axially from and parallel to said disk; a set of axially extending, singly curved radial flow vanes mounted between said shroud means radial section and said disk and receiving fluid discharged from the impeller discharge vanes; a set of axial flow guide vanes extending radially from the outer section of said casing toward said outer axial shroud section, arranged to receive fluid discharged from said radial flow vanes; a set of axial flow vanes mounted on said shroud means outer axial section and receiving fluid discharged from said casing vanes; and a return channel formed by the outer and inner casing sections including other guide vanes in said casing, for receiving fluid discharged from the axial flow vanes of said runner and directing such fluid axially to the impeller intake.

11. A hydraulic torque converter comprising, in combination, a stationary casing having inner and outer sections enclosing a working circuit; a pump impeller rotatably mounted in said casing and having an axial intake and radial discharge vanes; a turbine runner rotatably mounted in said casing and including a disk located between said impeller and a radial wall of said casing and shroud means including an inner axial section surrounding the impeller intake, and an outer axial section connected to the inner axial section by a radial section adjacent the discharge portion of said impeller and spaced axially from and parallel to said disk; a set of axially extending, singly curved radial flow vanes mounted between said shroud means radial section and said disk and receiving fluid discharged from the impeller discharge vanes; a set of axial flow guide vanes, extending radially from the outer section of said casing toward said outer axial shroud section arranged to receive fluid discharged from said radial flow vanes; a set of axial flow vanes mounted on said shroud means outer axial section and receiving fluid discharged from said casing vanes; and a return channel formed by the outer and inner casing sections and having a set of guide vanes adjustably mounted therein and arranged to receive fluid from said runner axial flow vanes and direct such fluid axially to the impeller intake.

12. A hydraulic torque converter comprising, in combination, a stationary casing having inner and outer sections enclosing a working circuit; a pump impeller rotatably mounted in said casing and having an axial intake and radial discharge vanes; a turbine runner rotatably mounted in said casing and including a disk located between said impeller and a radial wall of said casing and shroud means including an inner axial section surrounding the impeller intake, and an outer axial section connected to the inner axial section by a radial section adjacent the discharge portion of said impeller and spaced axially from and parallel to said disk; a set of axially extending, singly curved radial flow vanes mounted between said shroud means radial section and said disk and receiving fluid discharged from the impeller discharge vanes; a set of axial flow guide vanes, extending radially from the outer section of said casing toward said outer axial shroud section, arranged to receive fluid discharged from said radial flow vanes; a set of axial flow vanes mounted on said shroud means outer axial section and receiving fluid discharged from said casing vanes, the radial length of said runner axial flow vanes being in the range not less than 4.1% and not more than 9.6% of their mean radius of revolution and the discharge angle of said runner axial flow vanes being in the range not less than 12½° and not more than 30°; and a return channel formed by the outer and inner casing sections for receiving fluid discharged from the axial flow vanes of said runner and directing such fluid axially to the impeller intake.

13. A hydraulic torque converter comprising, in combination, a stationary casing having inner and outer sections enclosing a working circuit; a pump impeller rotatably mounted in said casing and having an axial intake and radial discharge vanes; a turbine runner rotatably mounted in said casing and including a disk located between said impeller and a radial wall of said casing and shroud means including an inner axial section surrounding the impeller intake, and an outer axial section connected to the inner axial section by a radial section adjacent the discharge portion of said impeller and spaced axially from and parallel to said disk; a set of axially extending, singly curved radial flow vanes mounted between said shroud means radial section and said disk and receiving fluid discharged from the impeller discharge vanes; a set of axial flow guide vanes, extending radially from the outer section of said casing toward said outer axial shroud section, arranged to receive fluid discharged from said radial flow vanes; a set of axial flow vanes mounted on said shroud means outer axial section and receiving fluid discharged from said casing vanes, the radial length of said runner axial flow vanes being in the range not less than 4.1% and not more than 9.6% of their mean radius of revolution and the discharge angle of said runner axial flow vanes being in the range not less than 12½° and not more than 30°; and a return channel formed by the outer and inner casing sections and having a set of guide vanes adjustably mounted therein and arranged to receive fluid from said runner axial flow vanes and direct such fluid axially to the impeller intake.

14. A hydraulic torque converter comprising, in combination, a stationary casing having inner and outer sections enclosing a working circuit; a pump impeller rotatably mounted in said casing and having an axial intake and radial discharge vanes; a turbine runner rotatably mounted in said casing and including a disk located between said impeller and a radial wall of said casing and shroud means including an inner axial section surrounding the impeller intake, and an outer axial section connected to the inner axial section by a radial section adjacent the discharge portion of said impeller and spaced axially from and parallel to said disk; a set of axially extending, singly curved radial flow vanes mounted between said shroud means radial section and said disk and receiving fluid discharged from the impeller discharge vanes; a set of axial flow guide vanes, extending radially from the outer section of said casing toward said outer axial shroud section, arranged to receive fluid discharged from said radial flow vanes; a set of axial flow vanes mounted on said shroud means outer axial section and receiving fluid discharged from said casing vanes; thrust wearing rings on the back of said impeller engaging said disk; thrust wearing rings on the back of said disk engaging said casing wall; a collecting chamber in said casing between said radial wall and said disk; means including apertures in said disk, for discharging leakage from said rings into said chamber; a pump chamber in said casing; means interconnecting said chambers; a pump having an intake in said pump chamber and driven by the impeller mounting shaft; means connecting the discharge of said pump to said working circuit; said pump acting as a pressure breakdown between said pump chamber and said working circuit and a return channel formed by the outer and inner casing sections for receiving fluid discharged from the axial flow vanes of said runner and directing such fluid axially to the impeller intake.

15. A hydraulic torque converter comprising, in combination, a stationary casing having inner and outer sections enclosing a working circuit; a pump impeller rotatably mounted in said casing and having an axial intake and radial discharge vanes; a turbine runner rotatably mounted in said casing and including a disk located between said impeller and a radial wall of said casing and shroud means including an inner axial section surrounding the impeller intake, and an outer axial section connected to the inner axial section by a radial section adjacent the discharge portion of said impeller and spaced axially from and parallel to said disk; a set of axially extending, singly curved radial flow vanes mounted between said shroud means radial section and said disk and receiving fluid discharged from the impeller discharge vanes; a set of axial flow guide vanes, extending radially from the outer section of said casing toward said outer axial shroud section, arranged to receive fluid discharged from said radial flow vanes; a set of axial flow vanes mounted on said shroud means outer axial section and receiving fluid discharged from said casing vanes; wearing rings on the back of said impeller engaging said disk; wearing rings on the back of said disk engaging said casing wall; a collecting chamber in said casing between said radial wall and said disk; means, including apertures in said disk, for discharging leakage from said rings into said chamber; a pump chamber in said casing; means interconnecting said chambers; a pump having an intake in said pump chamber and driven by the impeller mounting shaft; means connecting the discharge of said pump to said working circuit; said pump acting as a pressure breakdown between said pump chamber and said working circuit and a return channel formed by the outer and inner casing sections, including other guide vanes therein, for receiving fluid discharged from the axial flow vanes of said runner and directing such fluid axially to the impeller intake.

16. A hydraulic torque converter comprising, in combination, a stationary casing having inner and outer sections enclosing a working circuit; a pump impeller rotatably mounted in said casing and having an axial intake and radial discharge vanes; a turbine runner rotatably mounted in said casing and including a disk located between said impeller and a radial wall of said casing and shroud means including an inner axial section surrounding the impeller intake, and an outer axial section connected to the inner axial section by a radial section adjacent the discharge portion of said impeller and spaced axially from and parallel to said disk; a set of axially extending, singly curved radial flow vanes mounted between said shroud means radial section and said disk and receiving fluid discharged from the impeller discharge vanes; a set of axial flow guide vanes, extending radially from the outer section of said casing toward said outer axial shroud section, arranged to receive fluid discharged from said radial flow vanes; a set of axial flow vanes mounted on said shroud means outer axial section and receiving fluid discharged from said casing vanes; thrust wearing rings on the back of said impeller engaging said disk; thrust wearing rings on the back of said disk engaging said casing wall; a collecting chamber in said casing between said radial wall and said disk; means, including apertures in said disk, for discharging leakage from said rings into said chamber; a pump chamber in said casing; means interconnecting said chambers; a pump having an intake in said pump chamber and driven by the impeller mounting shaft; means connecting the discharge of said pump to said working circuit; said pump acting as a pressure breakdown between said pump chamber and said working circuit and a return channel formed by the outer and inner casing sections and having a set of guide vanes adjustably mounted therein and arranged to receive fluid from said runner axial flow vanes and direct such fluid axially to the impeller intake.

17. A hydraulic torque converter comprising, in combination, a stationary casing having inner and outer sections enclosing a working circuit; a pump impeller rotatably mounted in said casing and having an axial intake and radial discharge vanes; a turbine runner rotatably mounted in said casing and including a disk located between said impeller and radial wall of said casing and shroud means including an inner axial section surrounding the impeller intake, and an outer axial section connected to the inner axial section by a radial section adjacent the discharge portion of said impeller and spaced axially from and parallel to said disk; a set of axially extending, singly curved radial flow vanes mounted between said shroud means radial section and said disk and receiving fluid discharged from the impeller discharge vanes; a set of axial flow guide vanes, extending radially from the outer section of said casing toward said outer axial shroud section, arranged to receive fluid discharged from said radial flow vanes; a set of axial flow vanes mounted on said shroud means outer axial section and receiving fluid discharged from said casing vanes, the radial length of said runner axial flow vanes being in the range not less than 4.1% and not more than 9.6% of their mean radius of revolution and the discharge angle of said runner axial flow vanes being in the range not less than 12½° and not more than 30°; wearing rings on the back of said impeller engaging said disk; wearing rings on the back of said disk engaging said casing wall; a collecting chamber in said casing between said radial wall and said disk; means, including apertures in said disk, for discharging leakage from said rings into said chamber; a pump chamber in said casing; means interconnecting said chambers; a pump having an intake in said pump chamber and driven by the impeller mounting shaft; means connecting the discharge of said pump to said working circuit; said pump acting as a pressure breakdown between said pump chamber and said working circuit and a return channel formed by the outer and inner casing sections and having a set of guide vanes adjustably mounted therein and arranged to receive fluid from said runner axial flow vanes and direct such fluid axially to the impeller intake.

18. A hydraulic torque converter comprising, in combination, a stationary casing; a pump impeller and a turbine runner rotatably mounted in said casing, said impeller having a radial discharge; a first turbine stage having radial vanes; a first guide vane stage having axial vanes and following said first turbine stage; a second turbine stage having axial vanes and following said first guide vane stage; and a second guide vane stage receiving the discharge from the second turbine stage and returning the discharge to the impeller intake.

19. A converter as claimed in claim 8 including means connecting the roots of the second turbine stage vanes to the tips of the first turbine stage vanes.

20. A converter as claimed in claim 8 in which the length of the second turbine stage vanes is from 4.1% to 9.6% of their mean radius of revolution.

21. A converter as claimed in claim 8 in which the discharge angle of the second turbine stage vanes is between 12½° and 30°.

22. A converter as claimed in claim 8 including a skirt connected with the tips of the first turbine stage vanes and extending radially inwardly in parallel relation to the impeller intake and discharge.

OTTO A. BANNER.

REFERENCES CITED

The following references are of record in the file of this patent:

UNITED STATES PATENTS

| Number | Name | Date |
|---|---|---|
| 1,672,232 | Saives | Jan. 5, 1928 |
| 1,757,827 | Bauer et al. | May 6, 1930 |
| 1,855,967 | Jandasek | Apr. 26, 1932 |
| 2,102,635 | Lysholm et al. | Dec. 21, 1937 |
| 2,128,828 | Klepper | Aug. 30, 1938 |
| 2,186,025 | Jandasek | Jan. 9, 1940 |
| 2,205,794 | Jandasek | June 25, 1940 |
| 2,235,673 | Dodge | Mar. 18, 1941 |
| 2,293,767 | Salerni | Aug. 25, 1942 |